(12) United States Patent
Rethaber (10) Patent No.: US 11,925,140 B2
(45) Date of Patent: Mar. 12, 2024

(54) TRIMMER LINE CUTTING HEAD FOR MOUNTING ON A DRIVE SHAFT OF A TRIMMER

(71) Applicant: Andreas Stihl AG & Co. KG, Waiblingen (DE)

(72) Inventor: Achim Rethaber, Fellbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 577 days.

(21) Appl. No.: 17/001,734

(22) Filed: Aug. 25, 2020

(65) Prior Publication Data
US 2021/0059115 A1 Mar. 4, 2021

(30) Foreign Application Priority Data
Aug. 30, 2019 (EP) ..................................... 19194689

(51) Int. Cl.
*A01D 34/46* (2006.01)
*A01D 34/416* (2006.01)

(52) U.S. Cl.
CPC ..... *A01D 34/4161* (2013.01); *A01D 34/4165* (2013.01); *A01D 34/46* (2013.01)

(58) Field of Classification Search
CPC ............ A01D 34/4161; A01D 34/4165; A01D 34/46; A01D 34/4166; A01D 34/4163
See application file for complete search history.

(56) References Cited

U.S. PATENT DOCUMENTS

| | | | | |
|---|---|---|---|---|
| 4,020,552 A | * | 5/1977 | Mizuno | A01D 34/416 30/276 |
| 4,097,991 A | | 7/1978 | Proulx | |
| 4,136,446 A | | 1/1979 | Tripp | |
| 4,195,408 A | | 4/1980 | Palmieri et al. | |
| 4,349,962 A | * | 9/1982 | Itagaki | A01D 34/4163 30/276 |
| 4,561,180 A | * | 12/1985 | Pittinger, Sr. | A01D 34/4163 30/276 |
| 4,640,084 A | | 2/1987 | Baba | |

(Continued)

FOREIGN PATENT DOCUMENTS

| | | |
|---|---|---|
| AU | 28340/77 | 3/1979 |
| AU | 24647/88 | 5/1989 |

(Continued)

*Primary Examiner* — Abigail A Risic
(74) *Attorney, Agent, or Firm* — Gudrun E Huckett (57) ABSTRACT

A trimmer line cutting head has a trimmer line spool rotatably supported about an axis of rotation and disposed slidably between housing and housing cover along the axis of rotation. A spring element pretensions the trimmer line spool in an operating position of the trimmer line cutting head. An indexing device has a terminal stop connecting the trimmer line spool in the operating position to the housing in fixed connection for common rotation of trimmer line spool and housing. By applying an actuating force to the indexing device, the trimmer line spool is adjustable from the operating position axially into an inoperative state of the trimmer line cutting head for paying out trimmer line. The indexing device has a rotational stop formed in a slot in a wall of the trimmer line spool and limiting rotation of the trimmer line spool relative to the housing in the inoperative state.

17 Claims, 8 Drawing Sheets

(56) References Cited

U.S. PATENT DOCUMENTS

| | | | |
|---|---|---|---|
| 5,060,384 A * | 10/1991 | Everts | A01D 34/4162 30/276 |
| 5,095,688 A | 3/1992 | Fabrizio | |
| 5,136,782 A * | 8/1992 | Calcinai | A01D 34/4161 30/276 |
| 5,765,287 A * | 6/1998 | Griffini | A01D 34/4163 30/276 |
| 5,809,655 A | 9/1998 | Houben et al. | |
| 6,263,580 B1 | 7/2001 | Stark et al. | |
| 7,581,322 B2 * | 9/2009 | Proulx | A01D 34/416 30/276 |
| 8,429,886 B2 | 4/2013 | Kato et al. | |
| 9,861,033 B2 * | 1/2018 | Skinner | A01D 34/4163 |
| 10,273,112 B2 * | 4/2019 | Alliss | A01D 34/4166 |
| 2004/0148784 A1 * | 8/2004 | Grace | A01D 34/4163 30/276 |
| 2013/0145630 A1 | 6/2013 | Stones | |
| 2014/0325850 A1 | 11/2014 | Bone | |
| 2018/0020614 A1 * | 1/2018 | Alliss | A01D 34/4163 30/276 |
| 2018/0116106 A1 | 5/2018 | Kullberg et al. | |
| 2019/0075721 A1 * | 3/2019 | Cholst | A01D 34/4165 |
| 2020/0008348 A1 * | 1/2020 | Guo | A01D 34/4162 |
| 2020/0214202 A1 * | 7/2020 | Holman | A01D 34/733 |
| 2021/0137004 A1 * | 5/2021 | Nie | A01D 34/4162 |

FOREIGN PATENT DOCUMENTS

| | | |
|---|---|---|
| AU | 2015101406 | 12/2015 |
| CA | 2111025 | 6/1994 |
| CN | 203 233 683 | 10/2013 |
| CN | 109 937 679 | 6/2019 |
| EP | 0 271 762 | 6/1988 |
| KR | 2012 006 7735 | 6/2012 |

* cited by examiner

Fig. 14

TRIMMER LINE CUTTING HEAD FOR MOUNTING ON A DRIVE SHAFT OF A TRIMMER

BACKGROUND OF THE INVENTION

The invention relates to a trimmer line cutting head for mounting on a drive shaft of a trimmer, wherein the trimmer line cutting head comprises a housing, a trimmer line spool for a trimmer line with at least one spool wall, a housing cover, and an indexing device, wherein the trimmer line spool is rotatably supported to be rotatable about an axis of rotation and is held so as to be slidable between the housing and the housing cover in the direction of the axis of rotation. A spring element is provided and the trimmer line spool is pretensioned by the spring element into an operating position of the trimmer line cutting head. The indexing device comprises a terminal stop, and the trimmer line spool in the operating position is connected fixedly and non-rotatably to the housing by the terminal stop, wherein the trimmer line spool is adjustable from the operating position in the direction of the axis of rotation into an inoperative state of the trimmer line cutting head for feeding (paying out) a trimmer line wound onto the trimmer line spool by applying an actuating force that is acting on the indexing device. The indexing device comprises a rotational stop that limits a rotation of the trimmer line spool relative to the housing into the inoperative state.

A trimmer serves for mowing grass, shrub or the like. For this purpose, a trimmer line cutting head with a tool is driven in rotation about an axis of rotation of the trimmer line cutting head so that the grass is cut off upon contact with the tool. Inter alia, a trimmer line is generally used as a tool and, in operation of the trimmer line cutting head, is subject to a certain amount of wear. This wear leads to the trimmer line becoming shorter over its operating time so that the cutting function is impaired. With a trimmer line that is too short, mowing of grass, shrub or the like is hardly possible or even not possible at all. Therefore, the trimmer line must be replaced by a new trimmer line. Trimmer line cutting heads with indexing devices are known which, upon actuation of the indexing device, unwind a trimmer line that is wound onto the trimmer line spool so that the section of the trimmer line projecting from the trimmer line cutting head becomes longer again. In this way, the cutting function of the trimmer line cutting head is restored again.

In order to prevent that a complete reloading of the trimmer line on the trimmer line spool is needed too frequently (such reloading causes also an interruption of the use of the trimmer), the trimmer line spools are designed with a correspondingly large winding volume. The goal is here to be able to wind as much trimmer line as possible onto the trimmer line spool. The result is that the size of the trimmer line spool as well as that of the trimmer line cutting head increases, in particular in axial direction relative to the axis of rotation. Such a size of the trimmer line spool however has a negative effect on the cutting height of the trimmer line cutting head. Due to the axial configuration of the trimmer line spool, the distance from the bottom to the trimmer line at the location where the trimmer line is exiting from the housing of the trimmer line cutting head is also enlarged. The grass to be mowed can therefore no longer be cut off at the desired level.

It is the object of the invention to provide a trimmer line cutting head for mounting on a drive shaft of a trimmer, wherein the trimmer line cutting head comprises a compact configuration and at the same time comprises a high winding volume for accommodating the trimmer line.

SUMMARY OF THE INVENTION

In accordance with the invention, this is achieved in that the rotational stop is formed at a slot in the spool wall of the trimmer line spool.

It is provided that the trimmer line cutting head comprises a housing, a trimmer line spool for a trimmer line with at least one spool wall, a housing cover, and an indexing device. The indexing device comprises a terminal stop. By means of the terminal stop, the trimmer line spool is fixedly and non-rotatably connected to the housing in the operating position. The trimmer line spool is adjustable from the operating position in the direction of the axis of rotation into an inoperative state of the trimmer line cutting head for feeding (paying out) a trimmer line wound on the trimmer line spool by applying an actuating force which is acting on the indexing device. The indexing device comprises a rotational stop which limits a rotation of the trimmer line spool relative to the housing into the inoperative state. The rotational stop is formed in a slot in the spool wall of the trimmer line spool.

The conventional indexing devices for trimmer line cutting heads provide such a rotational stop by a partial raised portion, i.e., a projecting structure of the spool wall that can be engaged by a counter element. Due to the configuration of the rotational stop as a slot, the rotational stop is integrated in the spool wall. A raised portion of the trimmer line cutting head in the direction of the axis of rotation is therefore not needed. In this way, the size of the trimmer line spool can be reduced while the winding volume stays the same; in this way, a compact size of the trimmer line cutting head is achieved.

Preferably, an engagement element is arranged at the housing and, in the inoperative state, interacts with the slot. Upon transition from the operating position into the inoperative state, the engagement element engages the slot. The trimmer line spool rotates relative to the housing until the engagement element hits a circumferential wall of the slot, which forms the rotational stop, so that a further rotation of the trimmer line spool relative to the housing in the inoperative state is restricted.

The slot is preferably embodied as an opening. Accordingly, the slot has no bottom. Due to the configuration of the slot as an opening in the spool wall, the engagement element can protrude even deeper into the slot. In this way, when the engagement element hits the rotational stop which is formed by the circumferential wall of the slot, greater forces and moments can be transmitted from the housing to the trimmer line spool.

Therefore, an opening, i.e., a slot without a bottom, is formed in the spool wall so that the engagement element can protrude even deeper into the slot and a better force transmission or moment transmission between the spool and the housing is ensured.

The housing comprises preferably a substantially horizontal section which is positioned approximately perpendicularly to the axis of rotation of the trimmer line cutting head. The trimmer line spool comprises advantageously an upper spool wall which is neighboring the housing, in particular the horizontal section of the housing, wherein the slot is preferably formed at the upper spool wall of the trimmer line spool. The horizontal section passes advantageously into a circumferential section of the housing that extends coaxially to the axis of rotation of the trimmer line cutting head. Accordingly, the engagement element can be arranged also immediately at the housing, in particular at the horizontal section of the housing, so that a simple construction of the trimmer line cutting head is enabled.

The slot extends preferably in a circular arc shape about the axis of rotation across an angle section that preferably amounts to between 30° and 70°. Upon actuation of the indexing device into the inoperative state, the engagement element dips into the slot and moves along the slot until it hits the rotational stop of the slot. When the engagement element hits the rotational stop, the spool is braked in its relative movement relative to the housing. In this context, the trimmer line spool rotates relative to the housing approximately across the angle section that amounts to preferably between 30° and 70°. The engagement element comprises an extension which extends in tangential direction to the axis of rotation. In order for the engagement element to be able to immediately dip into the slot at the point in time of exerting the actuating force, the slot must at least accommodate a portion of the tangential extension. Therefore, the slot comprises an extended length at its end which is remote from the rotational stop. The angle section of the slot and a first rotational angle of the trimmer line spool differ by the amount of this extended length.

Advantageously, a structural raised portion is provided at the rotational stop of the slot. The structural raised portion effects a reduction of the contact pressure at the rotational stop upon engagement of the engagement element. Due to the structural raised portion, the contact surface between engagement element and rotational stop is enlarged so that the contact pressure is reduced. In this way, material fatigue is avoided and the operational strength of the trimmer line spool is increased. In comparison to a follower which is attached to the trimmer line spool, the structural raised portion has a significantly reduced axial height so that it has hardly an effect on the construction height of the trimmer line spool.

It is advantageously provided that the trimmer line spool comprises a hub segment for supporting the trimmer line spool relative to the housing and further comprises a trimmer line chamber segment for winding the trimmer line. The trimmer line chamber segment adjoins the hub segment, wherein the slot is formed in the trimmer line chamber segment. Preferably, the slot has a minimal distance relative to the axis of rotation, wherein the distance is measured in radial direction relative to the axis of rotation and corresponds at least to the distance of the tightest trimmer line winding relative to the axis of rotation. This minimal distance of the slot amounts to advantageously at least 20%, in particular at least 25%, preferably approximately 30%, of the diameter of the trimmer line spool. This is beneficial in regard to the force transmission and moment transmission between the housing and the trimmer line spool. A maximal distance of the slot relative to the axis of rotation is advantageously smaller than the distance between greatest possible trimmer line winding and the axis of rotation. The slot is therefore located in a region of the trimmer line spool which delimits the trimmer line windings in axial direction. This is also beneficial for the force transmission and moment transmission between the housing and the trimmer line spool.

The terminal stop of the indexing device is preferably arranged at the housing cover. The indexing device comprises preferably a counter stop which is arranged at the trimmer line spool. Advantageously, the counter stop in the operating position is in engagement with the terminal stop for a fixed connection between the trimmer line spool and the housing so that trimmer line spool and housing rotate together. In the operating position of the indexing device, the terminal stop of the housing cover contacts the counter stop of the trimmer line spool so that the trimmer line spool is fixedly connected for common rotation to the housing cover and thus also to the housing in rotational direction of the trimmer line cutting head. The trimmer line spool is entrained by its counter stop by means of the terminal stop of the housing cover by the rotational movement of the housing cover. In the operating position, the trimmer line spool and the housing rotate together in rotational direction of the trimmer line cutting head.

It is advantageously provided that the indexing device is embodied such that, upon actuation of the indexing device into the inoperative state, the trimmer line spool rotates relative to the housing about a first rotational angle until the rotational stop hits the engagement element. After the indexing device has been switched into the inoperative state and the trimmer line spool together with the slot has rotated until the engagement element has hit the rotational stop of the slot, the trimmer line spool is moved in axial direction in the direction toward the housing cover back to its initial position by the spring element, and in its initial position the counter stop and the terminal stop overlap in axial direction. In this context, the engagement element is moved axially away and out of the slot of the trimmer line spool so that the tangential operative connection between rotational stop at the slot and the engagement element at the housing is canceled. The trimmer line spool which has been braked by the engagement element hitting the rotational stop can continue its relative rotation relative to the housing.

It is advantageously provided that the trimmer line spool rotates about a second rotational angle relative to the housing, beginning with contacting of the rotational stop at the engagement element until contacting of the counter stop at the terminal stop, wherein a total rotational angle corresponds to the sum of the first rotational angle and the second rotational angle. The trimmer line spool now continues to rotate relative to the housing until the terminal stop of the housing cover hits the counter stop of the trimmer line spool and restricts the relative movement of the trimmer line spool. This state of the indexing device in which the trimmer line spool moves axially away from the engagement element of the housing and continues to rotate relative to the housing until it hits the terminal stop of the housing cover represents a further section of the inoperative state. In this further section of the inoperative state, the trimmer line spool rotates across the second rotational angle of the trimmer line spool. The indexing device passes from the further section of the inoperative state into the operating position as soon as the counter stop at the trimmer line spool hits the terminal stop of the housing cover and a fixed connection between the housing and the trimmer line spool for common rotation in the rotational direction of the trimmer line cutting head is reinstated.

Each actuation of the indexing device causes the trimmer line spool to rotate relative to the housing preferably about the total rotational angle relative to the housing. The total rotational angle corresponds to the angle which results from the angle distances of the counter stops or the terminal stops. Counter stops or terminal stops which are neighboring each other in the circumferential direction relative to the axis of rotation have the same angle distances wherein for the number four an angle section of 90° results. Preferably, the number of terminal stops or counter stops also corresponds to the number of rotational stops or engagement elements. The rotational stops and the engagement elements are matched in regard to their arrangement to the counter stops and terminal stops in such a way that, upon actuation of the indexing device, the indexing device is switched from the operating position into the inoperative state, into the further section of the inoperative state, and finally again into the operating position. The total rotational angle is the angle about which the trimmer line spool rotates relative to the housing upon one-time exertion of an actuating force. The total rotational angle is divided in this context into the first rotational angle of the trimmer line spool and into the second rotational angle of the trimmer line spool, the second rotational angle of the trimmer line spool being traveled by the trimmer line spool into its inoperative state. The second rotational angle of the trimmer line spool, i.e., the rotation in the further section of the inoperative state, corresponds to the difference of the total rotational angle and the first rotational angle. The first rotational angle is advantageously smaller than the second rotational angle. Since the first rotational angle is selected to be smaller than the second rotational angle, a stable web width is provided between the neighboring slots formed in the spool wall.

The actuating force is preferably applied by an actuating element onto the indexing device wherein the actuating element extends out of an opening of the housing cover away from the housing. In this way, the actuating element is very easily accessible for the operator. The trimmer line spool is preferably pretensioned by the spring element against the housing cover. In this way, an actuating direction of the indexing device in the direction toward the horizontal section of the housing is provided. The actuating direction is positioned parallel to the axis of rotation of the cutting head and is oriented toward the drive shaft. In order to actuate the actuating element, it is sufficient to push the trimmer line cutting head with its bottom side against the ground. Since the actuating element projects away from the housing cover, the actuating element contacts the ground and is pushed in against the spring force. In this way, the trimmer line spool which is in operative connection with the actuating element is moved in axial direction so that a relative movement of the trimmer line spool relative to the housing is enabled. This process can also be realized while the trimmer line cutting head is operating so that unwinding of the trimmer line from the trimmer line spool is enabled in a simple way.

The slot is preferably bounded by a circumferential wall surrounding the slot. Therefore, the circumferential wall bounds the slot in circumferential direction outwardly and inwardly, in radial direction relative to the axis of rotation. In an alternative embodiment, the slot can also be provided as an open slot that is open at the circumference. In other words, the slot in radial direction relative to the axis of rotation can be open in outward direction.

Preferably, the trimmer line spool comprises a trimmer line channel for insertion, in particular passing through, a trimmer line. Accordingly, the trimmer line can be inserted into the trimmer line channel, in particular completely passed through it, and subsequently can be wound onto the trimmer line spool by rotation of the spool. The trimmer line channel is advantageously embodied in a spool wall, in particular an intermediate spool wall of the trimmer line spool. In the region of the trimmer line channel the spool wall is of greater thickness so that the configuration of the trimmer line channel causes a reduction of the volume of a trimmer line chamber. The trimmer line can be wound in the trimmer line chamber. Since the indexing device at least partially utilizes the space of an existing wall, the axial construction space present in the housing and obtained in this way can be assigned to the height of the trimmer line chamber, and the loss of volume of the trimmer line chamber can be compensated at least partially.

Since the indexing device is located in the trimmer line chamber segment of the trimmer line spool, i.e., in radial direction within the trimmer line chamber, the trimmer line chamber can be extended in radial direction all the way to the housing so that a relatively large maximum winding diameter can be realized and a large trimmer line volume can therefore be stored on the trimmer line spool.

It can be expedient to design alternatively or additionally the counter stop as a slot and the terminal stop as an engagement element. In this case, the slot would be arranged in a lower spool wall of the trimmer line spool and the engagement element at the housing cover.

It can also be expedient that the actuating element does not project from an opening of the housing but itself is operatively connected to the housing instead of the trimmer line spool. Accordingly, upon actuation of the actuating element, the housing is lifted in axial direction relative to the trimmer line spool. In this way, the terminal stops and the counter stops are moved out of contact with each other, a relative movement of housing and trimmer line spool is realized with a first rotation and a second rotation of the housing in analogy to the already described first and second rotations of the trimmer line spool.

BRIEF DESCRIPTION OF THE DRAWING

Embodiments of the invention will be explained in the following with the aid of the drawing.

DESCRIPTION OF THE PREFERRED EMBODIMENTS

Figure 1:
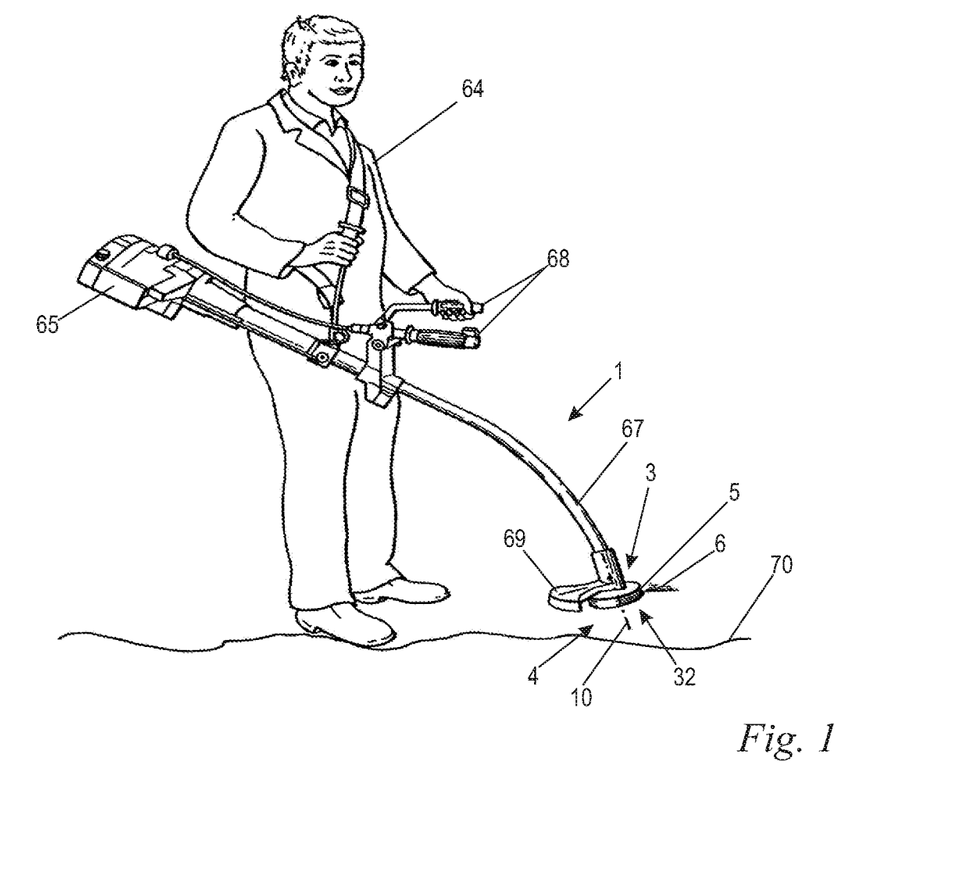
FIG. 1 is a schematic illustration of a trimmer which is held by a user.

FIG. 1 shows a trimmer in a schematic illustration. The trimmer 1 is held by an operator 64. The trimmer 1 has a rearward end with a rearward housing 65 and a front end from which a drive shaft, not illustrated, is projecting. A shaft 67 connects the rearward end and the front end. Handles 68 for guiding the trimmer 1 are arranged on the shaft 67. A trimmer line cutting head 5 is connected to the front end of the trimmer 1. The trimmer line cutting head 5 is fastened to the drive shaft and is driven in rotation about an axis of rotation 10 by a drive motor, not illustrated, in a rotational direction 29. The drive motor is arranged in the rearward housing 65 wherein a drive shaft is extending in shaft 67. It can be provided that the drive shaft is connected in the shaft immediately with the drive shaft for the trimmer line cutting head 5 so that no gear unit is intermediately connected. In an alternative embodiment, not illustrated, the drive motor, in particular an electric motor, can also be arranged in a front housing, not illustrated, which is arranged at the front end. Advantageously, a gear unit is provided also in the front housing. The trimmer line cutting head 5 is covered by a protective shield 69 at the side which is facing the operator 64 in operation. The trimmer line cutting head 5 comprises at least one trimmer line 6 which is provided for cutting material such as grass, shrub or the like. At the trimmer line cutting head 5, a bottom side 4 is formed which in operation is facing the ground 70. The bottom side 4 is arranged at the side of the trimmer line cutting head 5 which is facing away from the shaft 67. At the side of the trimmer line cutting head 5 which is facing the shaft 67, the top side 3 of the trimmer line cutting head 5 is formed. The protective clothing which is to be worn mandatorily by the operator 64 for operating the trimmer 1 is not illustrated in the simplified illustration in FIG. 1.

Figure 2:
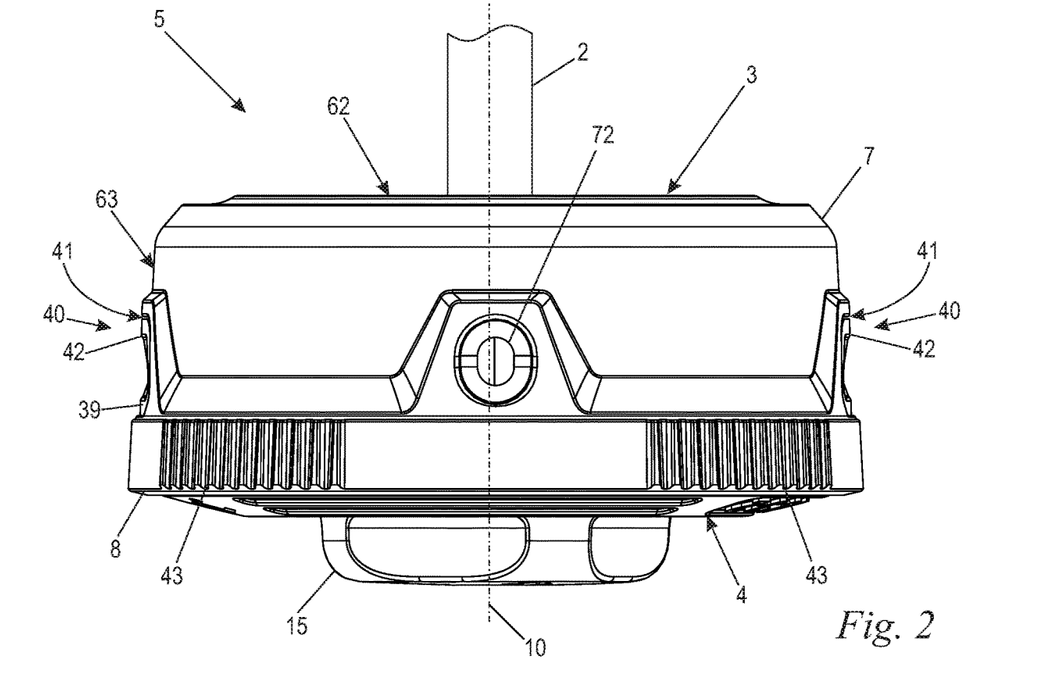
FIG. 2 is a side view of an embodiment of a trimmer line cutting head.

In FIG. 2, the trimmer line cutting head 5 is illustrated in a side view. In this illustration only a housing 7, a housing cover 8, the axis of rotation 10 as well as an actuating element 15 of the trimmer line cutting head 5 are illustrated. The housing 7 is cup-shaped and comprises in the embodiment a horizontal section 62 which is approximately oriented perpendicularly to the axis of rotation 10 of the trimmer line cutting head 5. In the preferred embodiment, the horizontal section 62 passes into a circumferential section 63 of the housing 7 which is substantially coaxial to the axis of rotation 10 of the trimmer line cutting head 5. At the circumferential section 63 of the housing 7, two oppositely positioned trimmer line openings 72 are provided through which the trimmer line 6 projects out of the housing 7. In an alternative embodiment of the trimmer line cutting head 5, it can be expedient to provide a different number of trimmer line openings 72. At the circumferential section 63 of the housing 7, two locking openings 41 are formed. The housing cover 8 comprises two locking noses 42 which engage the locking openings 41 of the housing 7 when attaching the housing cover 8. A locking nose 42 forms with the corresponding locking opening 41 a releasable snap connection 40 by means of which the housing cover 8 can be fixedly connected to the housing 7. Fixedly connected is to be understood here as a relative fixation relative to each other in all spatial directions. In the preferred embodiment, snap connections 40, each comprised of a locking nose 42 and a locking opening 41, are provided whereby a sufficient holding force between the housing 7 and the housing cover 8 is achieved. In an alternative embodiment of the trimmer line cutting head 5, a different number of snap connections 40 can be expedient also. When the housing cover 8 is attached to the housing 7, the mechanism with the corresponding components located in the trimmer line cutting head 5 is protected against soiling.

As illustrated in FIG. 2, the housing 7 comprises several gripping surfaces 43 at a circumferential side of the housing 7. The gripping surface 43 is designed as a toothing wherein the individual teeth extend approximately in the direction of the axis of rotation 10. The gripping surfaces 43 serve to provide a better grip of the trimmer line cutting head 5. When attaching the trimmer line cutting head 5 to the drive shaft 2, indicated schematically in FIG. 2, the trimmer line cutting head 5 in the mounted state is screwed onto the drive shaft 2. The gripping surfaces 43 at the housing 7 provide a slip-free hold at the housing 7 for the operator 64 and make it easier for the operator 64 to screw the trimmer line cutting head 5 onto the drive shaft 2 as well as detach the trimmer line cutting head 5 from the drive shaft 2. In the preferred embodiment, four gripping surfaces 43 are provided uniformly distributed about the circumferential side of the housing 7. Alternatively, a different number of gripping surfaces 43 may be expedient. The gripping surfaces 43 can also comprise other structures.

Figure 3:
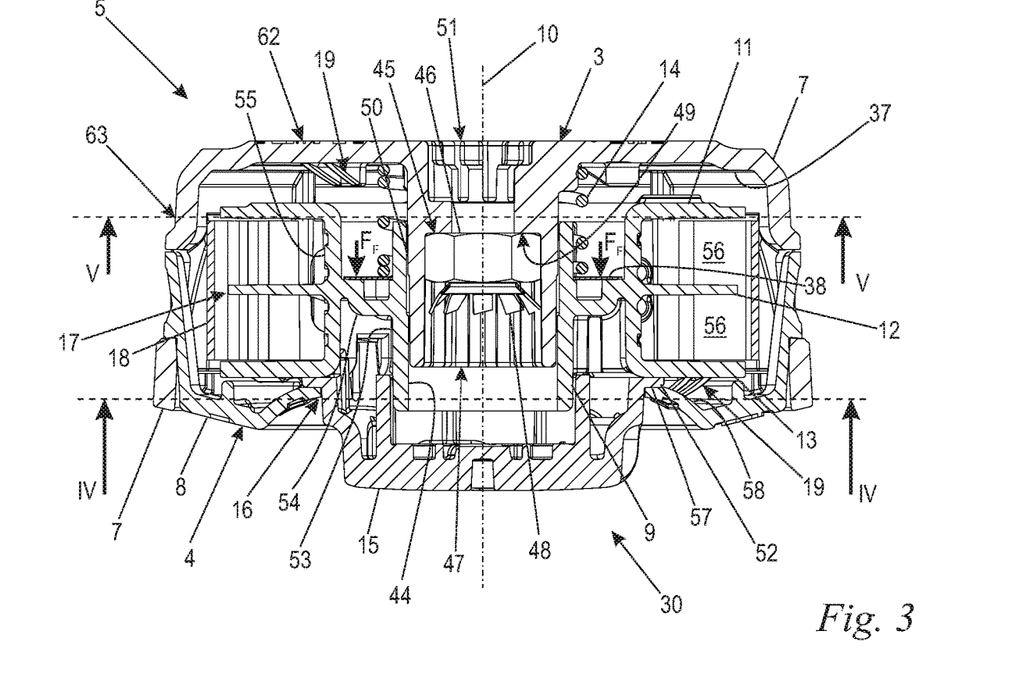
FIG. 3 is a section illustration of the trimmer line cutting head according to FIG. 2 in operating position.

In FIG. 3, the trimmer line cutting head 5 is illustrated in a section view. At the housing 7 of the trimmer line cutting head 5, a receptacle 45 is formed by means of which the trimmer line cutting head 5 is attached to the drive shaft 2. In the preferred embodiment, the receptacle 45 is formed by a nut 46 arranged in the housing 7 so as to be aligned coaxially to the axis of rotation 10. The housing 7 comprises in the embodiment in addition to its horizontal section 62 and its circumferential section 63 also a hollow cylindrical section 50 which is embodied coaxial to the axis of rotation 10. In the hollow cylindrical section 50, a double hexagon hole 47 is formed in which the nut 46 is arranged and secured against rotation relative to the housing 7. In the direction of the axis of rotation 10, the nut 46 is supported relative to the top side 3 of the trimmer line cutting head 5 by a housing shoulder 49 and relative to the bottom side 4 by a tooth lock washer 48. Moreover, at its top side 3, the trimmer line cutting head 5 comprises an opening 51 through which the drive shaft 2 is guided for attachment to the trimmer line cutting head 5 and secured by screwing on the nut 46. In an alternative embodiments, it can also be expedient to connect the drive shaft 2 fixedly to the trimmer line spool 9 for common rotation therewith and to fix the housing 7 by means of an indexing device 19 relative to the trimmer line spool 9.

As shown in FIG. 3, the trimmer line cutting head 5 comprises a trimmer line spool 9 for winding and unwinding the trimmer line 6. Moreover, in the embodiment, the indexing device 19 is provided which upon actuation causes the trimmer line spool 9 to rotate about a defined angle relative to the housing 7 and thereby unwind the trimmer line 6 from the trimmer line spool 9.

As illustrated in FIG. 3, the trimmer line spool 9 is secured slidably on the hollow cylindrical section 50 of the housing 7 in the direction of the axis of rotation 10. The trimmer line spool 9 comprises a hub 44 which is supported at a circumferential side 53 of the hollow cylindrical section 50 so as to be axially slidable in the direction of the axis of rotation 10.

As illustrated in FIG. 3, beginning at the hub 44 of the trimmer line spool 9, a web 54 extends in radial direction relative to the axis of rotation 10 and passes into a longitudinal wall 55 which extends in the direction of the axis of rotation 10. The trimmer line spool 9 comprises in the embodiment a plurality of spool walls 11, 12, 13, namely an upper spool wall 11, a bottom spool wall 13, and an intermediate spool wall 12 which is arranged between the upper spool wall 11 and the bottom spool wall 13. The upper spool wall 11 is positioned adjacent to the horizontal section 62 of the housing 7 and the bottom spool wall 13 adjacent to the housing cover 8. The spool walls 11, 12, 13 are connected to each other by means of the longitudinal wall 55. The trimmer line spool 9 comprises a trimmer line chamber 56 for winding the trimmer line 6 therein; the trimmer line chamber 56 is delimited in the direction of the axis of rotation 10 toward the top side 3 of the trimmer line cutting head 5 by the upper spool wall 11 and toward the bottom side 4 of the trimmer line cutting head 5 by the bottom spool wall 13. In radial direction toward the axis of rotation 10, the trimmer line chamber 56 is delimited by the longitudinal wall 55 of the trimmer line spool 9. The trimmer line 6 can be wound across the entire trimmer line chamber 56 between the upper spool wall 11 and the bottom spool wall 13 minus the intermediate spool wall 12.

Figure 6:
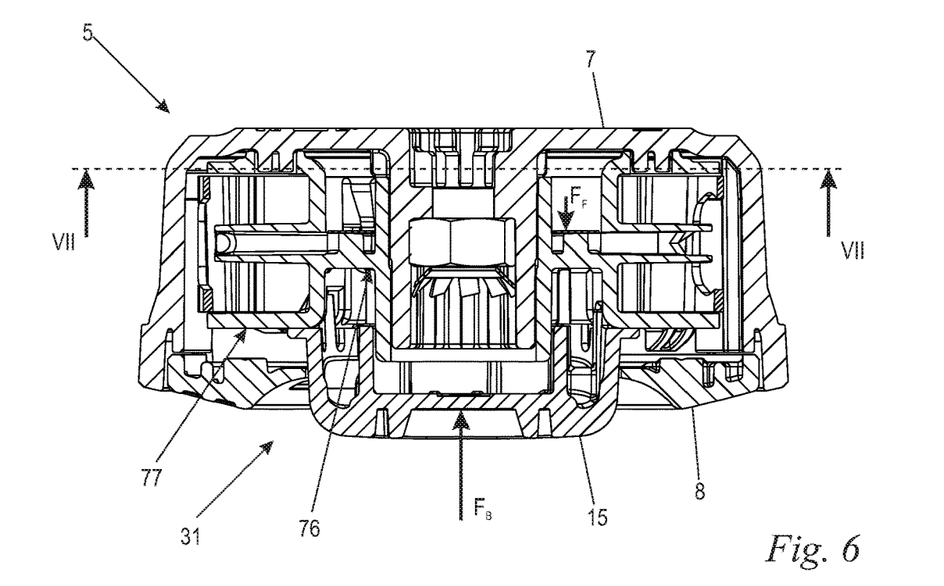
FIG. 6 is a section illustration of the trimmer line cutting head according to FIG. 2 in the inoperative position in accordance the covered first rotational angle of the trimmer line spool.

As illustrated in FIG. 6, the trimmer line spool 9 in radial direction relative to the axis of rotation 10 is to be divided into a hub chamber segment 76 and a trimmer line chamber segment 77. In this context, the boundaries of the trimmer line chamber segment 77 correspond also to the boundaries of the trimmer line chamber 56. Therefore, the web 54 of the trimmer line spool 9 as well as the hub 44 of the trimmer line spool 9 are to be correlated with the hub chamber segment 76. The slot 24 with the rotational stop 23 is formed in the region of the trimmer line chamber segment 77 at the trimmer line spool 9.

Figure 4:
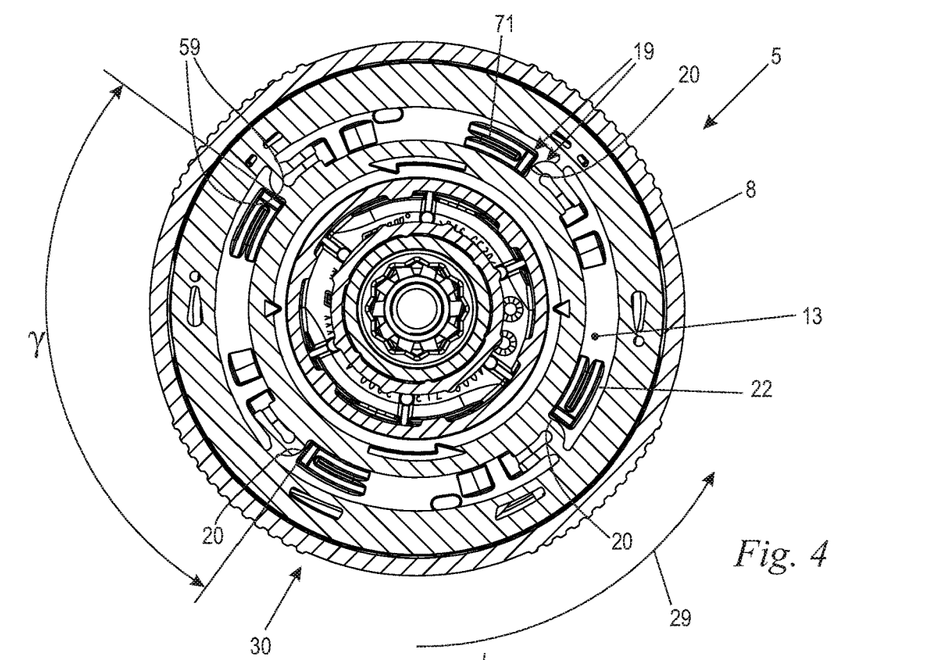
FIG. 4 is a section illustration of the trimmer line cutting head in the direction of arrows IV of FIG. 3.

As illustrated in FIG. 4, at the housing cover 8 a terminal stop 20 is provided which is arranged at an inner cover side 58, i.e., the side of the housing cover 8 which is facing the housing 7. A counter stop 22 is provided at the trimmer line spool 9 and is arranged at the bottom spool wall 13 at the side which is facing the housing cover 8. The terminal stop 20 and the counter stop 22 are part of the indexing device 19. In the operating position 30 of the indexing device 19 illustrated in FIG. 3, the terminal stop 20 at the housing cover 8 acts on the counter stop 22 of the trimmer line spool 9 in rotational direction 29 of the trimmer line cutting head 5.

The terminal stop 20 and the counter stop 22 contact each other in a contact surface 59 so that the trimmer line spool 9 is entrained by the housing cover 8 in rotational direction 29 of the trimmer line cutting head 5. In this context, the terminal stop 20 and the counter stop 22 form a form-fit connection in rotational direction 29 of the trimmer line cutting head 5. Accordingly, the trimmer line spool 9 and the housing cover 8, thus also the trimmer line spool 9 and the housing 7, are connected to each other in the rotational direction 29. In this operating position 30 of the indexing device 19, the trimmer line cutting head 5 can be used by the operator 64 for cutting grass, shrub or the like.

Figure 12:
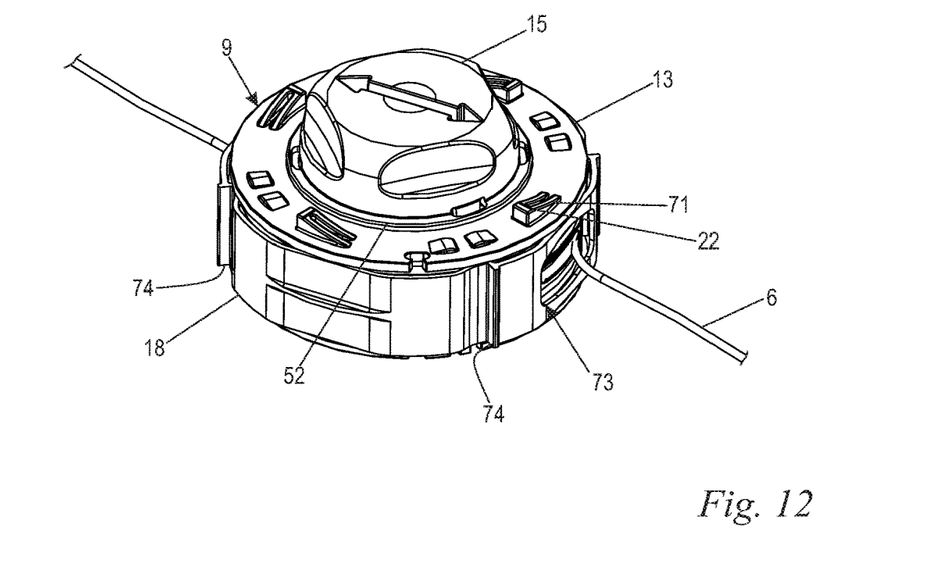
FIG. 12 is a perspective illustration of the trimmer line spool with clamping ring in a view from below.

As illustrated in FIG. 12, the counter stops 22 at the bottom spool wall 13 of the trimmer line spool 9 are slanted in rotational direction 29. In this way, a type of ramp 71 of the counter stop 22 is provided. In analogy, the terminal stops 20 are also slanted, in a direction opposite to the rotational direction 29, in the form of a ramp 71. Thus, the trimmer line spool 9 and the housing cover 8 are secured with form fit in the rotational direction 29 while opposite to the rotational direction 29 a relative rotation is possible because the terminal stop 20 and the counter stop 22 slide away from each other on their ramps 71. A form fit connection by the terminal stop 20 and the counter stop 22 is not provided in a direction opposite to the rotational direction 29.

As illustrated in FIG. 4, in the preferred embodiment four terminal stops 20 and four counter stops 22 are provided which are respectively arranged at the same distance relative to the axis of rotation 10 and are uniformly distributed about the axis of rotation 10. In case of a uniform distribution of the four terminal stops 20, a total angle distance γ of neighboring terminal stops of 90° is provided about the axis of rotation 10. The same holds true also for the counter stops 22 at the trimmer line spool 9. In an alternative embodiment, a different number of terminal stops 20 as well as counter stops 22 can be expedient also. The number of terminal stops 20 at the housing 7 corresponds to the number of counter stops 22 at the trimmer line spool 9. By means of the four pairs of counter stops 22 and terminal stops 20, high torque can be transmitted from the housing cover 8 to the trimmer line spool 9.

As illustrated in FIG. 3, the trimmer line cutting head 5 comprises a spring element 14 that is arranged between the housing 7 and the trimmer line spool 9. The trimmer line spool 9 is pretensioned by the spring element 14 in the direction of the bottom side 4 of the trimmer line cutting head 5, in other words, in the direction toward the housing cover 8.

In the preferred embodiment, the spring element 14 is designed as a coil spring and the coil spring is arranged coaxial to the axis of rotation 10. The housing 7 comprises an inner side 37 facing the housing cover 8 and the spring element 14 is supported against the inner side 37. In the direction toward the bottom side 4 of the trimmer line cutting head 5, the spring element 14 is contacting a support plate 38 which is arranged on the web 54 of the trimmer line spool 9. In this context, the spring element 14 forces the support plate 38 against the web 54 so that the trimmer line spool 9 is tensioned in the direction toward the housing cover 8. The spring element 14 is pretensioned in the operating position 30 of the indexing device 19. The spring element 14, supported at the housing 7, is acting with a spring force $F_F$ on the trimmer line spool 9 in the direction toward the housing cover 8.

As illustrated in FIGS. 2 and 3, the actuating element 15 is arranged at the bottom side 4 of the trimmer line cutting head 5 and serves for actuating the indexing device 19. The housing cover 8 comprises an opening 16 which is aligned coaxially to the axis of rotation 10 and through which the actuating element 15 is projecting. Accordingly, the actuating element 15 is accessible for the operator 64 in the mounted state of the trimmer line cutting head 5. The actuating element 15 comprises a shoulder 52 which is extending in radial direction away from the axis of rotation 10. The trimmer line spool 9 is contacting with its bottom spool wall 13 the shoulder 52 of the actuating element 15 and forces the latter against a clamping surface 57 of the housing cover 8 that is formed adjacent to the opening 16. Accordingly, the actuating element 15 is tensioned by the spring element 14 with the spring force $F_F$ against the housing cover 8 via the trimmer line spool 9.

Figure 7:
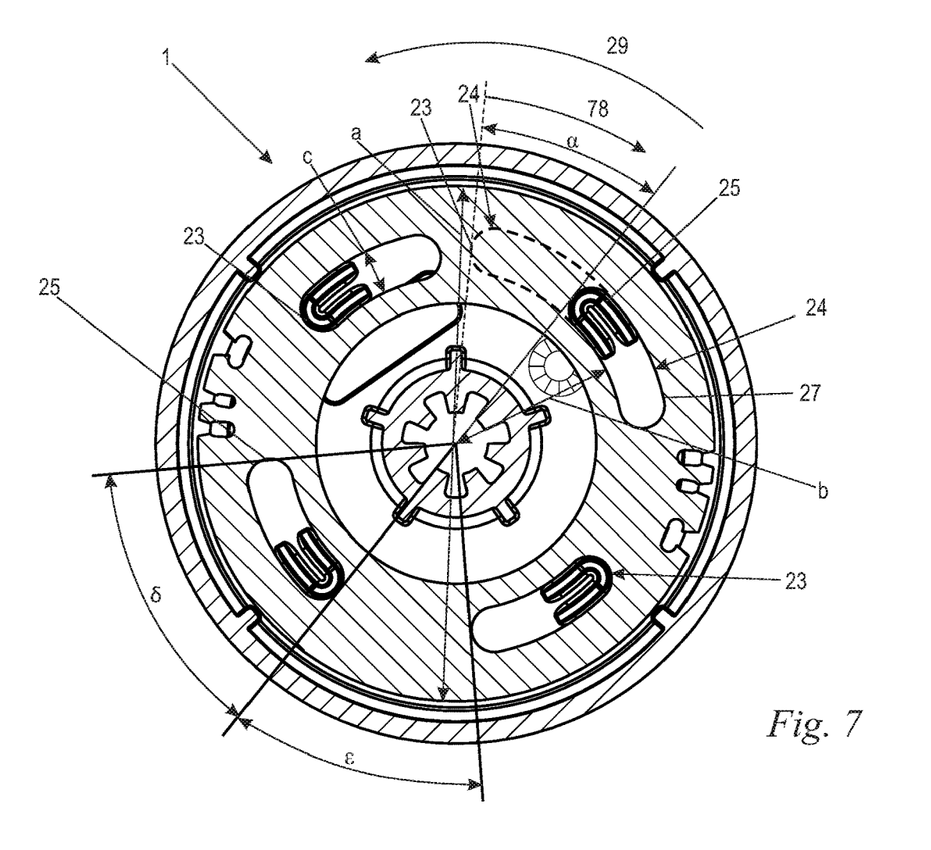
FIG. 7 is a section illustration of the trimmer line cutting head in the direction of arrows VII according to FIG. 6.

As illustrated in FIGS. 6 and 7, the trimmer line spool 9 comprises a plurality of rotational stops 23 which interact with a corresponding number of engagement elements 25 which are formed at the inner side 37 of the housing 7. The engagement elements 25 as well as the rotational stops 23 are also part of the indexing device 19.

Figure 8:
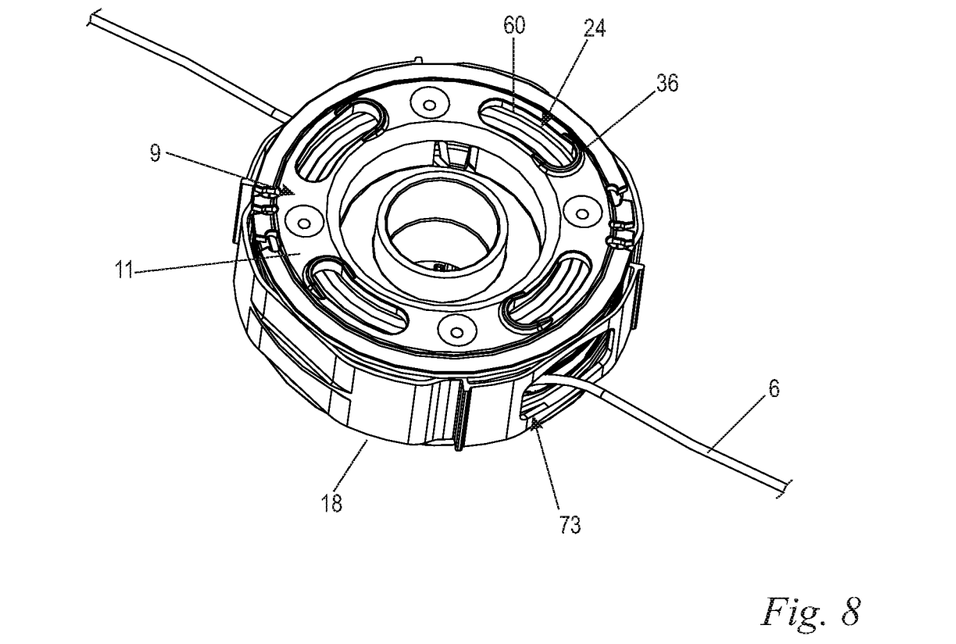
FIG. 8 is a perspective illustration of the trimmer line spool with clamping ring in a view from above.

As is shown in FIGS. 7 and 8, at the upper spool wall 11 of the trimmer line spool 9 there are four rotational stops 23 provided which are formed each at a slot 24 in the upper spool wall 11. The rotational stops 23 are formed at the end of the slots 24 positioned in rotational direction. In the inoperative state 31 the trimmer line spool 9 rotates relative to the housing 7 opposite to the rotational direction 29 in a relative rotational direction 78. The rotational stops 23 are positioned at the following end of the slots 24 relative to the relative rotational direction 78 of the trimmer line cutting head 5. The slots 24 hit respectively with their following end the engagement elements 25 which protrude into the slots 24 at the leading end. The slots 24 extend about an angle section δ about the axis of rotation 10 wherein the angle section δ amounts to approximately 30° to 70°. Neighboring slots 24 have in the embodiment an angle distance ε measured about the axis of rotation 10 wherein the angle distance ε amounts to at least 15°, in particular at least 30°, preferably approximately 40°. The angle distance ε is to be selected such that at the upper spool wall 11 between two slots 24 sufficient material for a high structural stiffness is provided. In case of less than four slots 24 at the upper spool wall 11, a significantly greater angle distance ε between two slots 24 can be adjusted also. In analogy to the terminal stops 20 as well as the counter stops 22, the rotational stops 23 are arranged at a total angle distance γ of 90°.

In an alternative embodiment of the trimmer line cutting head 5, a different number of rotational stops 23 and thus also a different total angle distance γ can be expedient also.

The slot 24 has a distance b (FIG. 7) relative to the axis of rotation 10 that is measured in radial direction relative to the axis of rotation 10 wherein the distance b amounts to at least 20%, in particular at least 25%, preferably approximately 30%, of the diameter a of the trimmer line spool 9. In addition, the slot 24 has a width c (FIG. 7) measured in radial direction relative to the axis of rotation 10 that amounts to at least 5%, preferably at least 10%, preferably approximately 15% of the diameter a of the trimmer line spool 9.

The slot 24 is rounded at its ends that are lying in circumferential direction. In this way, the contact surface that is limited due to the wall thickness of the trimmer line spool 9 is enlarged and thus the contact pressure reduced. Moreover, notching effects are reduced.

Figure 5:
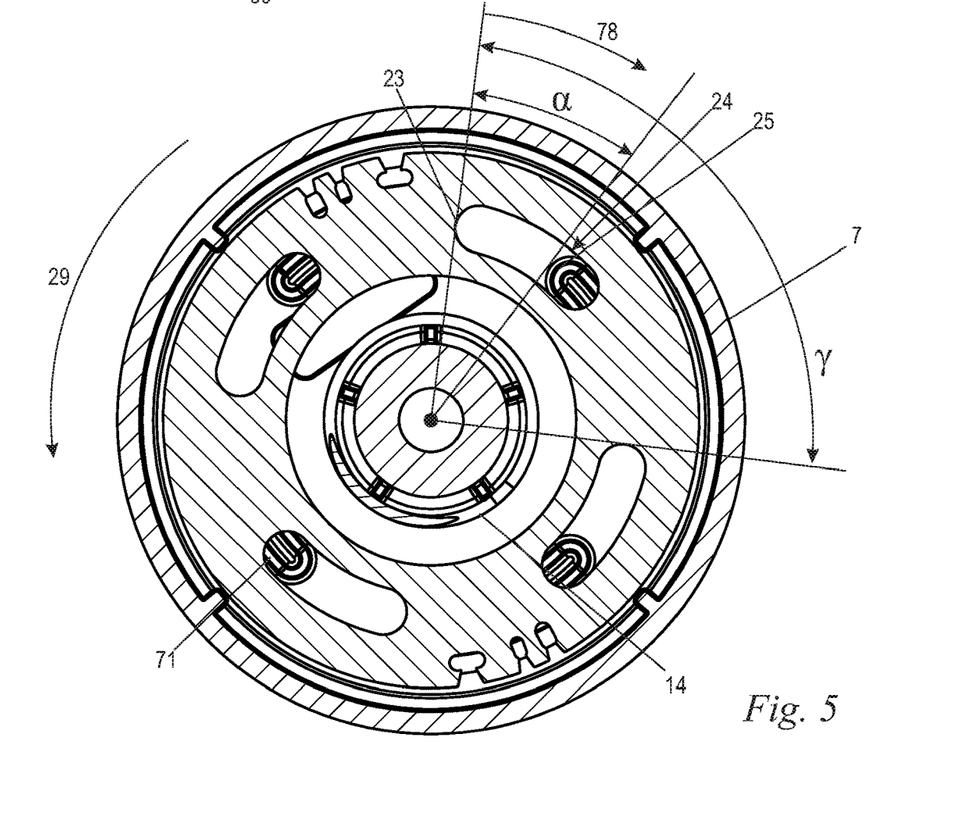
FIG. 5 is a section illustration of the trimmer line cutting head in the direction of arrows V of FIG. 3.

As illustrated in FIGS. 6 and 7, a plurality of engagement elements 25 are arranged at the inner side 37 of the housing 7 in the horizontal section 62. The number of engagement elements 25 as well as the total angle distance γ of neighboring engagement elements 25 relative to each other correspond to that of the rotational stops 23. In the preferred embodiment, the engagement elements 25 are embodied as U-shaped raised portions which, beginning at the inner side 37 of the housing 7, extend in the direction of the axis of rotation 10 toward the bottom side 4 of the trimmer line cutting head 5. Due to the U-shaped configuration of the engagement elements 25, the engagement elements 25 are in flush contact at the slots 24 when contacting the rounded rotational stop 23. As can be seen in FIGS. 3 and 5, the engagement elements 25 are slanted in a direction opposite to the rotational direction 29.

Figure 9:
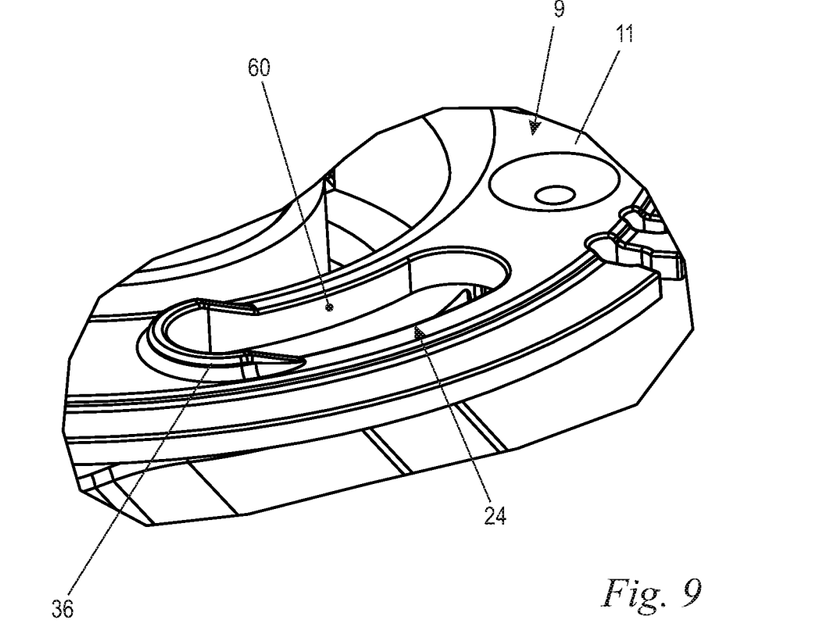
FIG. 9 is a perspective detail view of the slot of the trimmer line spool.

As illustrated in FIGS. 8 and 9, the slot 24 is designed as an opening in the upper spool wall 11 in the preferred embodiment. A slot 24 in the meaning of the invention can thus be a slot with a bottom but also a slot 24 without bottom, i.e., in the form of an opening. The slot 24 in the preferred embodiment is bounded by a circumferential wall 60 surrounding the slot 24. Accordingly, the circumferential wall 60 in the circumferential direction bounds the slot 24 radially inwardly and outwardly relative the axis of rotation 10. In an alternative embodiment, the slot 24 can also be a slot that is circumferentially outwardly open. In other words, the slot in radial direction beginning at the axis of rotation 10 can be open outwardly. However, in this context, the web which is formed between neighboring slots 24 advantageously does not project radially past the bottom spool wall 13 of the trimmer line spool 9.

Figure 10:
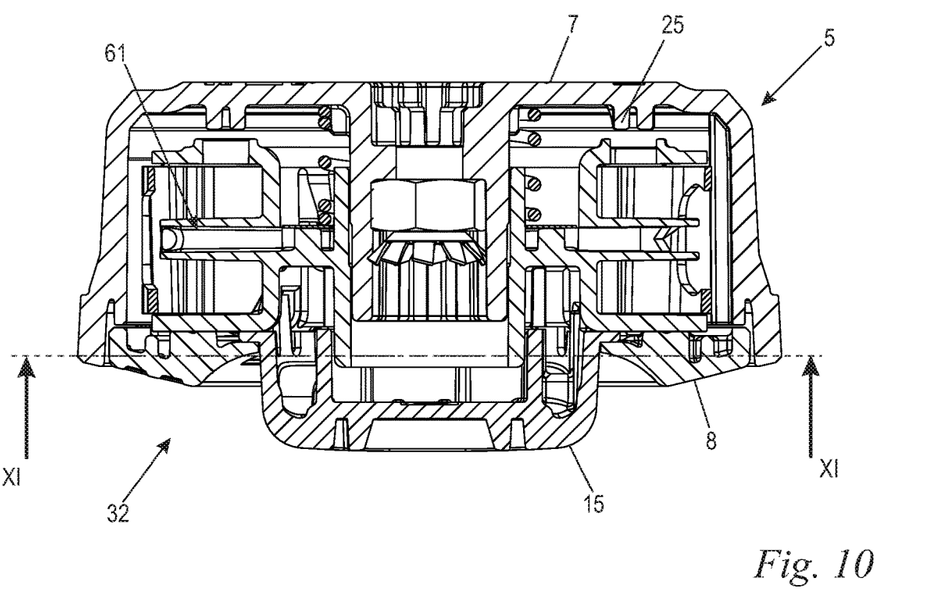
FIG. 10 is a section illustration of the trimmer line cutting head according to FIG. 6 with already assumed initial axial position.

As can be seen in FIGS. 8, 9, and 10, at the end of the slot 24 viewed in rotational direction 29, a structural raised portion 36 is provided which, when the engagement element 25 and the rotational stop 23 contact each other, reduces the contact pressure at the rotational stop 23. In this way, the load which is acting on the rotational stop 23 is reduced so that the operating time of the trimmer line cutting head 5 is increased.

In the following, the unwinding process of the trimmer line 6 upon actuation of the indexing device 19 will be explained:

In FIG. 3, the indexing device 19 is illustrated in its operating position 30. The terminal stop 20 of the housing cover 8 as well as the counter stop 22 of the trimmer line spool 9 are in engagement and form a form fit connection in the rotational direction 29 of the trimmer line cutting head 5. In FIG. 6, the indexing device 19 is illustrated in the inoperative state 31 in which the trimmer line spool 9 has already traveled about a first rotational angle α (FIG. 5). The actuating element 15 has been pushed in by an actuating force $F_B$ against the spring force $F_F$ and pushes in this context the trimmer line spool 9 in the direction toward the top side 3 of the trimmer line cutting head 5, i.e., in direction toward the drive shaft 2. In this context, the operative connection between the terminal stop 20 of the housing cover 8 and the counter stop 22 of the trimmer line spool 9 is canceled. At the same time, the engagement elements 25 at the housing 7 dip into and engage the slots 24 at the upper spool wall 11 of the trimmer line spool 9. In this context, the engagement elements 25 engage axially from above the slots 24, i.e., in the direction from the top side 3 to the bottom side 4 in the direction of the axis of rotation 10. The trimmer line spool 9 rotates relative to the housing 7 opposite to the rotational direction 29 until the engagement elements 25 of the housing 7 stop at the rotational stop 23 of the slots 24.

Due to the centrifugal force which is acting on the trimmer line 6, the trimmer line 6 is pulled tangentially to the trimmer line spool 9 so that the trimmer line spool 9 rotates in a relative rotational direction 78 relative to the housing 7. Upon relative movement between trimmer line spool 9 and housing 7, the trimmer line 6 is unwound by a corresponding angle section from the trimmer line spool 9 and this angle section corresponds to the first rotational angle α of the trimmer line spool 9. The first rotational angle α is somewhat smaller than the angle section δ of the slot 24 because the engagement element 25 first dips into the slot 24 and therefore can then rotate only by the length of the slot 24 minus its own immersed length in the slot 24.

As soon as the engagement element 25 comes into contact with the rotational stop 23 of the slot 24, the relative movement of the trimmer line spool 9, oriented opposite to the rotational direction 29 of the trimmer line cutting head 5 in the relative rotational direction 78 of the trimmer line spool 9, is braked. In FIG. 5, the engagement element 25 has dipped into the slot 24. The trimmer line spool 9 must rotate about the first rotational angle α in the relative rotational direction 78 so that the rotational stop 23 of the trimmer line spool 9 stops at the engagement element 25 of the housing 7. In FIG. 7, the trimmer line spool 9 has rotated with the rotational stop 23 about the first rotational angle α so that the rotational stop 23 contacts the engagement element 25. The dashed illustration of the slot 24 illustrates the position of the trimmer line spool 9 with the slot 24 prior to the first rotation α. In this position, the trimmer line spool 9, if no actuating force $F_B$ is acting anymore, is forced by the spring element 14 again in the direction toward the bottom side 4 of the trimmer line cutting head 5 and is tensioned against the housing cover 8.

Figure 11:
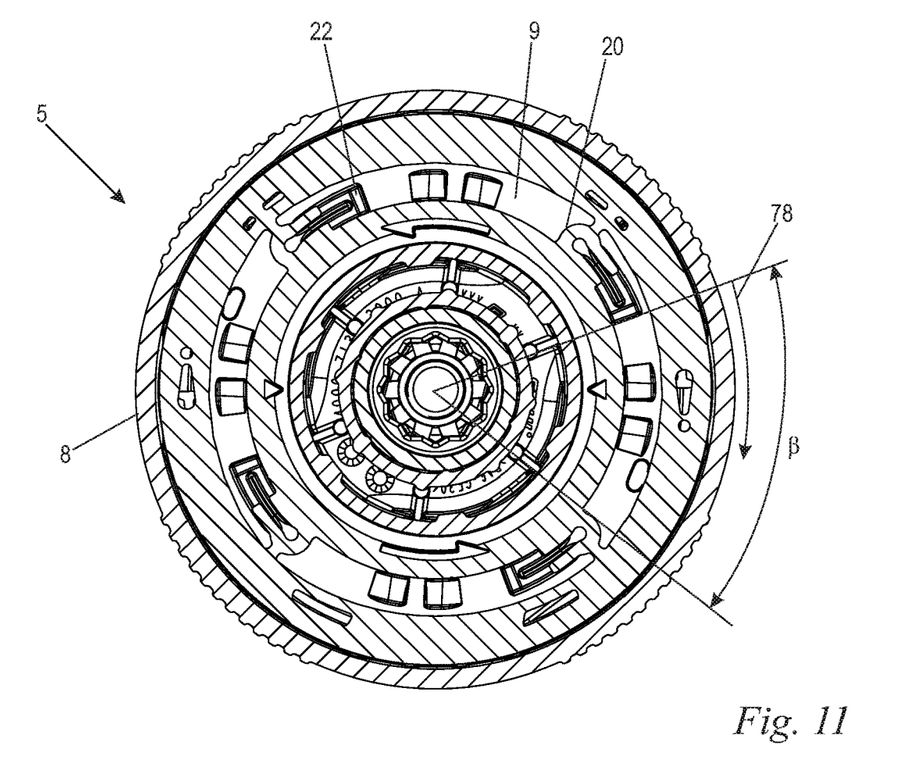
FIG. 11 is a section illustration of the trimmer line cutting head in the direction of arrows XI of FIG. 10 with the second rotational angle of the trimmer line spool still to be carried out.

As illustrated in FIG. 10, the indexing device 19 is then in a further section 32 of the inoperative state in which the trimmer line spool 9 relative to the housing 7 rotates further about the second rotational angle β of the trimmer line spool 9 (FIG. 11) until the counter stop 22 of the trimmer line spool 9 contacts the terminal stop 20 of the housing cover 8. In the further section 32 of the inoperative state 31 of the indexing device 19, the trimmer line spool 9 rotates relative to the housing 7 opposite to the rotational direction 29 in the relative rotational direction 78 of the trimmer line spool 9 about the second rotational angle β of the trimmer line spool 9. Subsequently, a rotationally fixed position in the rotational direction 29, namely the operating position 30, is reached again and the trimmer line 6 has been unwound by an amount corresponding to the total angle distance γ. In this context, the total angle distance γ corresponds to the sum of the first rotational angle α of the trimmer line spool 9 and the second rotational angle β of the trimmer line spool 9.

The reduced construction height of the trimmer line cutting head 5 is achieved in that the slot 24 is formed in the upper spool wall 11 of the trimmer line spool 9. This causes the structure of the upper spool wall to be subjected to comparatively high loads. To ensure that in the inoperative state 31 of the indexing device 19 no forces that are too large act on and damage the upper spool wall 11 upon contact of the engagement element 25 at the rotational stop 23, the slot 24 is to be embodied correspondingly short. On the one hand, this leads to the web between neighboring slots to be as large as possible and, on the other hand, to the trimmer line spool 9 being able to accelerate only comparatively briefly until the rotational stop 23 of the trimmer line spool 9 hits the engagement element 25 so that the forces at the time of the engagement element 25 hitting the rotational stop 23 can be kept low. The upper spool wall 11 thus will not be damaged.

In an embodiment not illustrated, the same functional principle of embodying the rotational stop 23 at the slot 24 can also be used in connection with the terminal stop 20 and the counter stop 22. The counter stop 22 of the lower spool wall 13 can also be provided as a slot that is provided at the bottom spool wall 13 so that the terminal stop 20 engages the slot.

Figure 13:
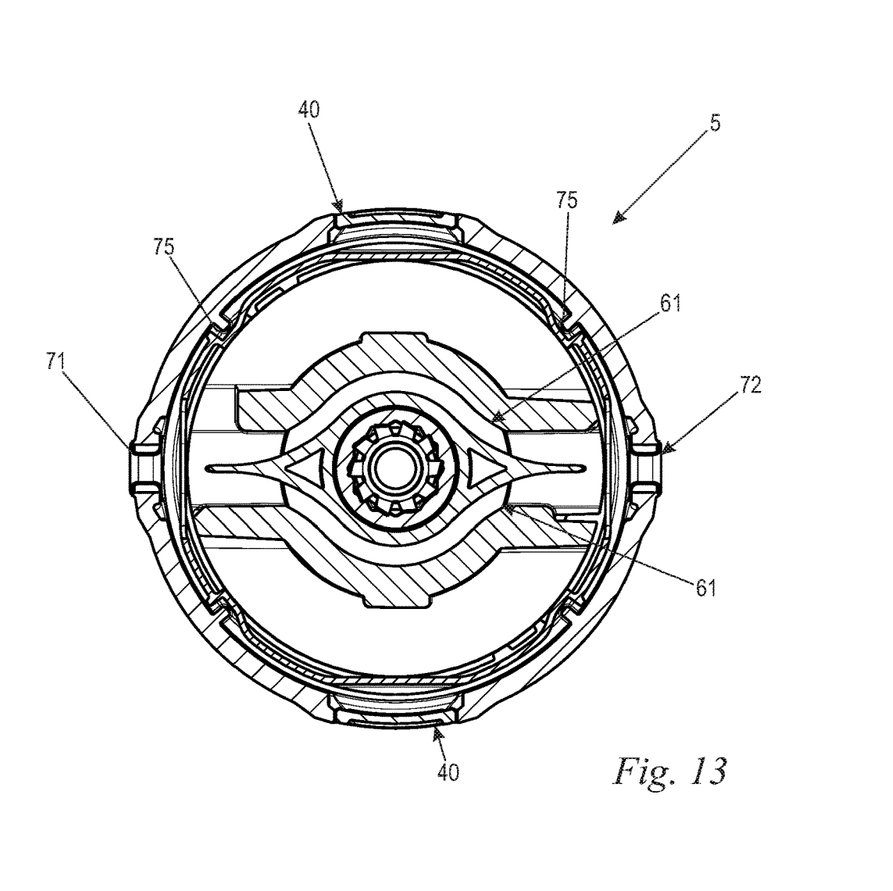
FIG. 13 is a section illustration of the trimmer line cutting head with trimmer line channel.

As illustrated in FIG. 13, the trimmer line cutting head 5 comprises a trimmer line channel 61 which extends across the entire diameter d of the trimmer line spool 9. When winding the trimmer line 6 onto the trimmer line spool 9, the trimmer line 6 is pushed through the trimmer line channel 61 and oriented centrally to the axis of rotation 10. The trimmer line spool 9 is then to be rotated opposite to the rotational direction 29 relative to the housing 7. Due to the ramps 71 at the terminal stops 20, at the counter stops 22, and at the engagement elements 25, the corresponding stops glide across each other and therefore enable a relative movement of the trimmer line spool 9 relative to the housing 7 opposite to the rotational direction 29. This is possible due to the ability of the trimmer line spool 9 to axially move relative to the housing 7. In an alternative embodiment, not illustrated, of the trimmer line cutting head 5 it can be expedient to provide instead of one trimmer line channel 61 two trimmer line channels which do not extend across the entire diameter d of the trimmer line spool 9. Thus, the alternative trimmer line channels can also be designed as blind holes.

As illustrated in particular in FIGS. 8 and 12, at the circumferential side 60 of the trimmer line spool 9 a clamping ring 18 for avoiding an accidental unwinding of the trimmer line 6 is arranged. In this way, the trimmer line 6 is held between the longitudinal wall 55, the spool walls 11, 12, 13, and the clamping ring 18. In order to be able to thread the trimmer line 6 through the trimmer line openings 72, the clamping ring 18 has also a corresponding number of openings 73. The trimmer line 6 projects, beginning at the trimmer line spool 9, through the openings 73 of the clamping ring 18 in outward direction through the trimmer line openings 72. In order for the openings 73 of the clamping ring 18 to be arranged congruently to the trimmer line openings 72 at the housing 7 so that the trimmer line 6 can be mounted from the exterior of the housing 7, the clamping ring 18 is secured with form fit at the housing 7. At the clamping ring 18, a plurality of shoulders 74 are formed which are resting with form fit at corresponding counter shoulders 75 at the inner wall of the housing 7 distributed about the axis of rotation 10. This has the result that, upon rotation of the trimmer line spool 9, the clamping ring 18 that is connected fixedly to the housing 7 rotates relative to the trimmer line spool 9 and thereby secures the trimmer line 6 in the trimmer line chamber 56 of the trimmer line spool 9.

Figure 14:
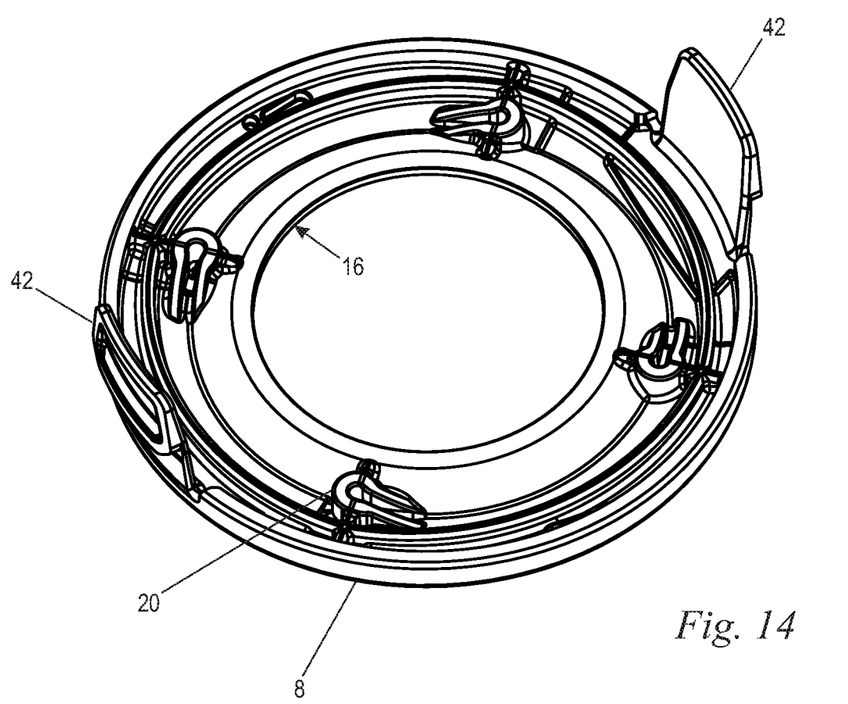
FIG. 14 is a perspective illustration of the housing cover.

In FIG. 14, the housing cover 8 is illustrated. FIG. 14 illustrates clearly the opening 16 of the housing cover 8 through which the actuating element 15 in the mounted state of the trimmer line cutting head 5 is projecting. In addition, the locking noses 42 of the housing cover are shown which together with the locking openings 41 of the housing form the locking connections 40. In addition, four terminal stops 20 are illustrated which interact with the counter stops 22 of the trimmer line spool 9.

The specification incorporates by reference the entire disclosure of European (EPO) priority document 19 194 689.6 having a filing date of Aug. 30, 2019.

While specific embodiments of the invention have been shown and described in detail to illustrate the inventive principles, it will be understood that the invention may be embodied otherwise without departing from such principles.

What is claimed is:
1. A trimmer line cutting head comprising:
a housing;
a housing cover connected to the housing;
a trimmer line spool comprising a spool wall, wherein the trimmer line spool is rotatably supported about an axis of rotation in the housing and is disposed slidably between the housing and the housing cover in a direction of the axis of rotation in an installed state of the trimmer line spool;
a spring element arranged in the housing and pretensioning the trimmer line spool in an operating position of the trimmer line cutting head;
an indexing device comprising a terminal stop, wherein the terminal stop connects the trimmer line spool in the operating position to the housing in a fixed connection for a common rotation of the trimmer line spool with the housing;
wherein, by applying an actuating force acting on the indexing device, the trimmer line spool is adjustable from the operating position in a direction of the axis of rotation into an inoperative state of the trimmer line cutting head for paying out a trimmer line wound onto the trimmer line spool;
wherein the indexing device further comprises a rotational stop limiting a rotation of the trimmer line spool relative to the housing in the inoperative state;

wherein the rotational stop is formed in a slot in the spool wall of the trimmer line spool;
wherein the slot in the spool wall is a through opening in the spool wall.

2. The trimmer line cutting head according to claim 1, further comprising an engagement element arranged at the housing and configured to interact with the slot in the spool wall in the inoperative state.

3. The trimmer line cutting head according to claim 1, wherein the spool wall of the trimmer line spool is an upper spool wall neighboring the housing.

4. The trimmer line cutting head according to claim 1, wherein the slot extends about an angle section about the axis of rotation in the form of a circular arc, wherein the angle section amounts to between 30° and 70°.

5. The trimmer line cutting head according to claim 1, wherein the rotational stop comprises a structural raised portion at the slot.

6. The trimmer line cutting head according to claim 1, wherein the trimmer line spool further comprises a hub segment configured to rotatably support the trimmer line spool in the housing and further comprises a trimmer line chamber segment adjoining the hub segment and configured to accommodate the trimmer line, wherein the trimmer line chamber segment comprises the spool wall with the slot.

7. The trimmer line cutting head according to claim 1, wherein the terminal stop of the indexing device is arranged at the housing cover and wherein the indexing device further comprises a counter stop provided at the trimmer line spool and configured to interact with the terminal stop.

8. The trimmer line cutting head according to claim 7, wherein the counter stop in the operating position engages the terminal stop to produce the fixed connection for common rotation of the trimmer line spool with the housing.

9. The trimmer line cutting head according to claim 1, further comprising an engagement element arranged at the housing and configured to interact with the slot in the spool wall in the inoperative state, wherein the indexing device is configured such that, when the indexing device is acted on by the actuating force, the trimmer line spool is rotated relative to the housing about a first rotational angle into a first section of the inoperative state, wherein the first rotational angle is defined by the engagement element hitting the rotational stop.

10. The trimmer line cutting head according to claim 9, wherein the indexing device further comprises a counter stop provided at the trimmer line spool and configured to interact with the terminal stop, wherein the trimmer line spool is configured to rotate about a second rotational angle relative to the housing from the first section of the inoperative state until the counter stop hits the terminal stop, wherein a total rotational angle of the trimmer line spool is a sum of the first rotational angle and of the second rotational angle.

11. The trimmer line cutting head according to claim 1, further comprising an actuating element, wherein the actuating force is applied by the actuating element to the indexing device, wherein the actuating element extends from an opening of the housing cover in a direction away from the housing.

12. The trimmer line cutting head according to claim 1, wherein the trimmer line spool is pretensioned by the spring element against the housing cover.

13. The trimmer line cutting head according to claim 1, wherein the slot is delimited by a circumferential wall surrounding the slot.

14. The trimmer line cutting head according to claim 1, wherein the trimmer line spool comprises a trimmer line channel configured to insert the trimmer line.

15. The trimmer line cutting head according to claim 14, wherein the trimmer line channel is configured to allow the trimmer line to pass through the trimmer line channel.

16. The trimmer line cutting head according to claim 1, wherein the indexing device comprises a plurality of said rotational stop, wherein the slots of the plurality of said rotational stop are spaced apart from each other at an angle distance measured about the axis of rotation, wherein the angle distance amounts to at least 15°.

17. The trimmer line cutting head according to claim 16, wherein the angle distance amounts to at least 30°.

* * * * *